June 28, 1960 L. B. SMITH 2,942,440
COUPLING
Filed Sept. 19, 1957 3 Sheets-Sheet 1
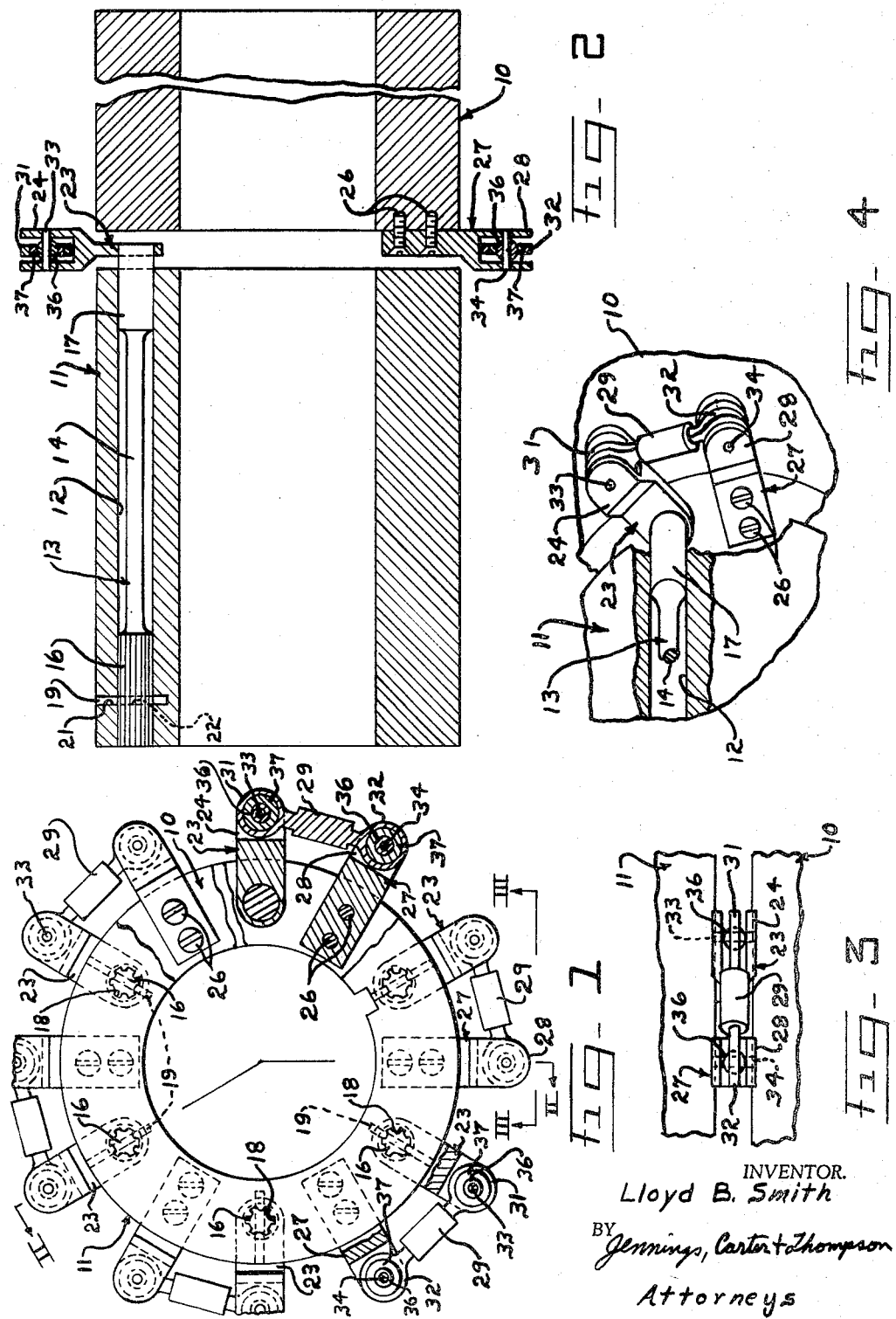
INVENTOR.
Lloyd B. Smith
BY Jennings, Carter + Thompson
Attorneys June 28, 1960
L. B. SMITH
2,942,440
COUPLING
Filed Sept. 19, 1957
3 Sheets-Sheet 2
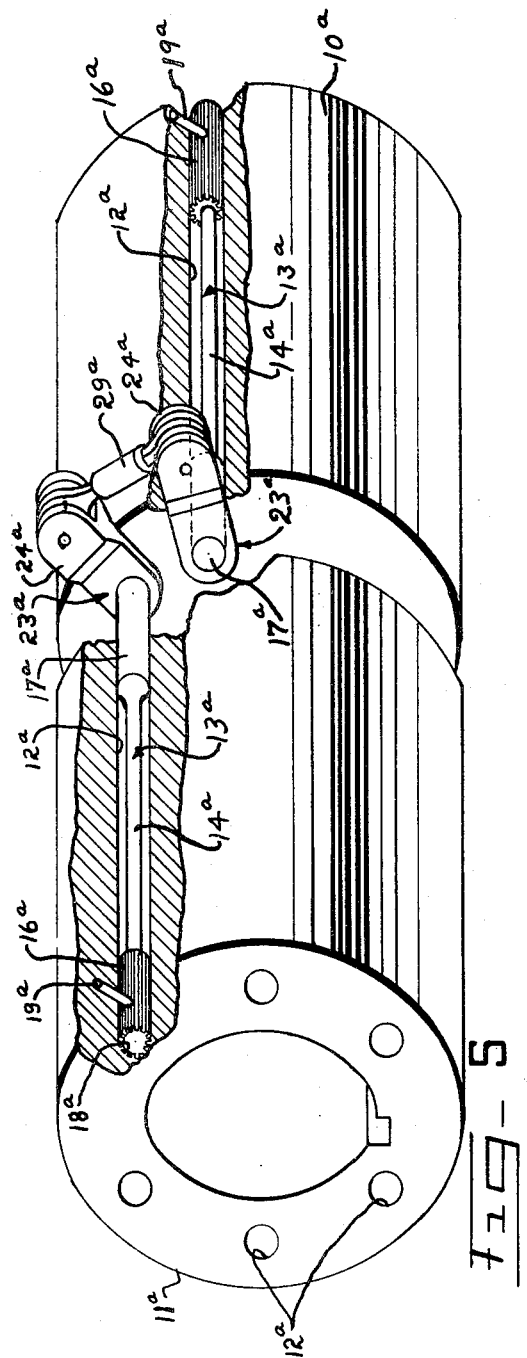
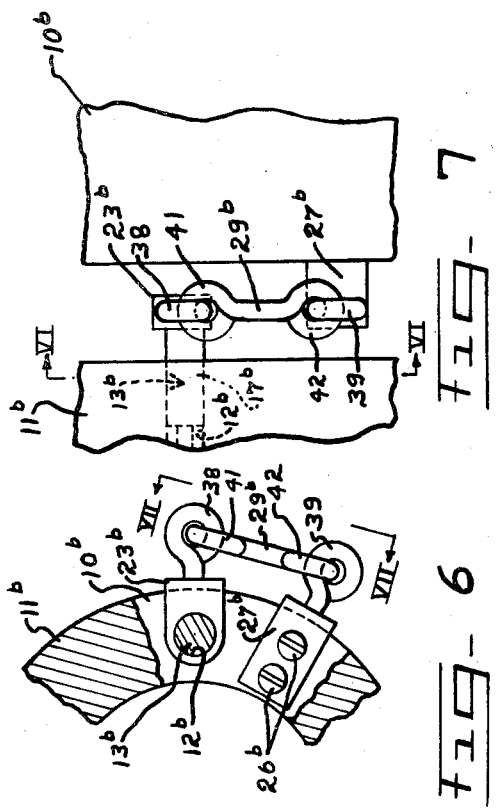
INVENTOR.
Lloyd B. Smith
BY
Jennings, Carter & Thompson
Attorneys June 28, 1960 L. B. SMITH 2,942,440
COUPLING
Filed Sept. 19, 1957 3 Sheets-Sheet 3

INVENTOR.
Lloyd B. Smith
BY
Jennings, Carter & Thompson
Attorneys

United States Patent Office 2,942,440
Patented June 28, 1960

2,942,440

COUPLING

Lloyd B. Smith, 824 N. 31st St., Birmingham, Ala.

Filed Sept. 19, 1957, Ser. No. 684,877

11 Claims. (Cl. 64—19)

This invention relates to a coupling and more particularly to a flexible or resilient coupling for connecting a driving member to a driven member whereby the driving and driven members may be deflected relative to each other to reduce to a minimum the destructive effects of high torque fluctuations on the coupling and driven apparatus.

Another object of my invention is to provide a resilient coupling of the character designated in which the shock loads are spread over a relatively long period of time, thus greatly reducing stresses in the apparatus associated therewith.

Another object of my invention is to provide a resilient coupling of the character designated in which the effects of parallel and angular misalignment and free end float of the driving and driven members are reduced to a minimum.

A more specific object of my invention is to provide a resilient coupling for transmitting power from one rotary member to another rotary member which shall embody a radially extending member operatively connected adjacent its inner end to one of the rotary members and a second radially extending member operatively connected adjacent its inner end to the other of the rotary members. A link operatively connects the outer ends of the radially extending members to each other and a spring member is interposed between at least one of the radially extending members and its associated rotary member.

A further object of my invention is to provide a coupling of the character designated in which the velocity of movement of its parts or surfaces that move relative to each other is reduced to a minimum and more surface contact is provided.

A further object of my invention is to provide a resilient coupling of the character designated which shall have a greater safety factor in that a substantial reserve overtravel is provided.

A still further object of my invention is to provide a resilient coupling of the character designated which shall be simple of construction, economical of manufacture and one which is particularly adapted for use in transmitting power from internal combustion engines and the like to any type of driven equipment, such as compressors, pumps and other driven equipment of a similar fluctuating torque nature.

Apparatus embodying features of my invention is illustrated in the accompanying drawings, forming a part of this application, in which:

Fig. 1 is an end elevational view, partly broken away and in section, showing my improved coupling associated with a driving member and a driven member;

Fig. 2 is a sectional view taken generally along line II—II of Fig. 1 with all but one pair of the coupling devices being omitted for the sake of clarity;

Fig. 3 is a detailed view taken generally along the line III—III of Fig. 1;

Fig. 4 is a fragmental perspective view, partly broken away and in section;

Fig. 5 is a perspective view, partly broken away and in section, showing a modified form of coupling with all but one pair of the coupling devices being omitted for the sake of clarity;

Fig. 6 is a fragmental view, partly broken away and in section, taken generally along the line VI—VI of Fig. 7 and showing another form of coupling;

Fig. 7 is a fragmental view taken generally along the line VII—VII of Fig. 6;

Figure 9:
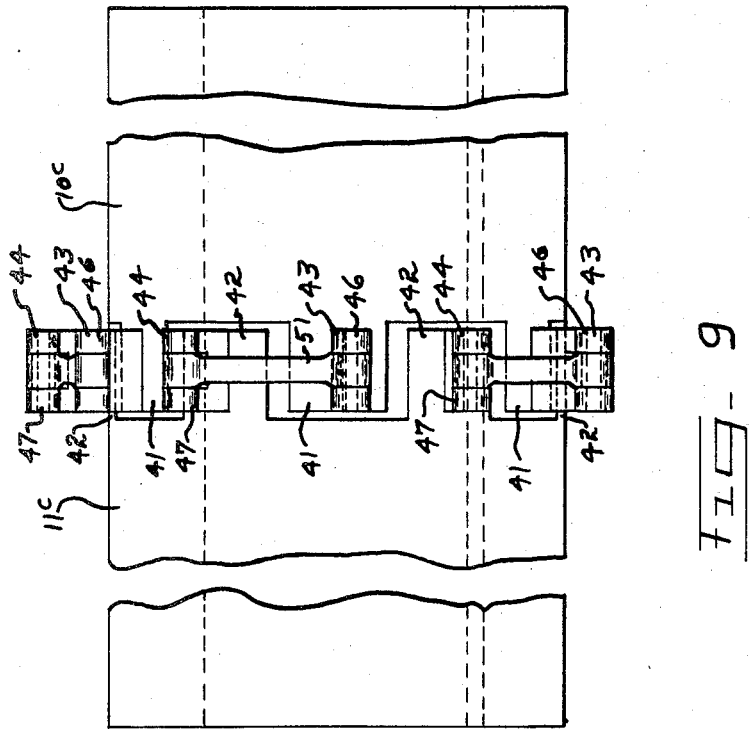

Referring now to the drawings for a better understanding of my invention, I show a driving member 10 and a driven member 11. The driving member 10 may be in the form of a hollow shaft keyed to a prime mover while the driven member 11 may be in the form of a hollow shaft which is keyed to a shaft to be driven. The driving member 10 and the driven member 11 are separate and are connected by the resilient coupling now to be described.

The driven member 11 is provided with a plurality of angularly spaced openings 12 for receiving elongated torsion bars 13. As shown in Figs. 2 and 4, each torsion bar 13 is provided with a reduced diameter central portion 14 and enlarged diameter portions 16 and 17 at opposite ends thereof. The enlarged diameter portion 16 is secured non-rotatably to the driven member 11 by a spline connection 18, as shown in Fig. 1. To prevent axial shifting of the torsion bar 13 relative to the driven member 11, a pin 19 extends transversely through the enlarged diameter portion 16, as shown in Fig. 2. A suitable opening 21 is provided in the driven member 11 and an opening 22 is provided in the enlarged diameter portion 16 of the torsion bar for receiving the pin 19. The enlarged diameter portion 17 engages the adjacent surface of the opening 12 to form a bearing member for that end of the torsion bar. The intermediate portion 14 of the torsion bar being smaller in diameter forms an elongated torsion spring.

Secured non-rotatably to the end of the enlarged diameter portion 17 of each torsion bar 13 is a radially extending arm 23. The outer ends of the radially extending arms 23 are bifurcated to provide a yoke 24.

Secured to the driving member 10 by any suitable means, such as by screws 26 are a plurality of radially extending arms 27 having bifurcated outer ends 28. As shown in Fig. 1, the radially extending arms 27 are positioned between the radially extending arms 23 to provide a radially extending arm 27 for each radially extending arm 23. Extending between the outer ends of each pair of radially extending arms 23 and 27 is a connecting rod or link 29 having ball joint ends 31 and 32 which fit within the bifurcated ends 24 and 28, respectively, and are secured thereto by transverse pins 33 and 34, respectively. The ball joint ends 31 and 32 each comprises a central steel ball portion 36 through which the pins 33 and 34 pass. Surrounding the central ball portion 36 is an annular bronze bearing member 37. Preferably, the central steel ball portion 36 is formed of polished steel.

From the foregoing description, the operation of my improved coupling shown in Figs. 1 through 4 will be readily understood. With the driving member 10 connected to the driven member 11 by the radially extending arms 27, links 29, radially extending arms 23, torsion bars 13 and the splined connections 16, a resilient coupling is provided which permits the driving and driven members to move angularly relative to each other to spread peak or shock loads over a relatively long period of time, thus greatly reducing the stresses in the coupling as well as the apparatus connected thereto. As the driving member 10 is rotated, the torsion bars 13 are twisted, transferring the load from the driving member 10 to the driven member 11. Preferably, the ball joints are of the self-aligning type. The entire coupling is self-aligning and slight mis-alignment of the shafts relative to each other does not adversely affect the operation of the coupling or the members connected thereto. The long radially extending arms 23 and 27 greatly reduce the effect of misalignment of the driving and driven members relative to each other due to the fact that a substantial misalignment of the driving and driven elements relative to each other would have a relatively small effect on the angular deflections of the radially extending arms relative to the connecting links. That is to say, with applicant's apparatus a misalignment of the driving and driven shafts of one-quarter inch would mean only a deflection of approximately one-sixteenth of an inch of the ball joint surfaces relative to the outer ends of the radially extending arms. Also, the relatively long connecting links in addition to the relatively small ball joint ends 31 and 32 reduces greatly the velocity of movement of the adjacent parts or surfaces relative to each other. Accordingly, any rubbing action between the parts is greatly levered down.

Referring now to Fig. 5 of the drawings, I show a modified form of coupling which comprises a driving member 10a and a driven member 11a. Both the driving member and the driven member are provided with radially spaced openings 12a for receiving elongated torsion bars 13a. The torsion bars 13a are similar in every respect to the torsion bars 13 and are provided with a small diameter central portion 14a and enlarged diameter end portions 16a and 17a. Each enlarged diameter portion 16a is anchored to the driven member 11a by a splined connection 18a and a transverse pin 19a which extends through suitable openings in the driven member 11a and the enlarged diameter portion 16a. The enlarged diameter portion 17a engages the inner surface of the opening 12a to provide a bearing for the torsion bar.

Secured non-rotatably to the enlarged diameter portions 17a of the torsion bars 13a are radially extending arms 23a having bifurcated upper ends 24a. The radially extending arms 23a associated with the driving element 10a are positioned between the radially extending arms 23a associated with the driven member 11a. It will be noted that only one pair of arms 23a are shown in Fig. 5 of the drawings, for the sake of clarity.

The coupling shown in Fig. 5 operates in the same manner as the apparatus shown in Figs. 1 to 4, the only difference being that instead of anchoring the radially extending arm which is associated with the driving member directly to the driving member, the radially extending member is secured non-rotatably to the torsion bar which in turn is anchored to the driving member.

Referring now to Figs. 6 and 7 of the drawings, I show another form of coupling which comprises a driving member 10b and a driven member 11b. The driven member 11b has a plurality of axially extending openings 12b therein for receiving elongated torsion bars 13b which are similar in every respect to the torsion bars 13 and 13a. An enlarged diameter portion 17b of each torsion bar 13b is connected non-rotatably to a radially extending arm 23b. Mounted at the outer end of each radially extending arms 23b is a loop member 38. Secured to the driving member 10b by means of screws 26b is a radially extending arm 27b having a loop member 39 mounted at the outer end thereof. The loop members 38 and 39 are connected by a link 29b having loops 41 and 42 at opposite ends thereof for engaging the loops 38 and 39, respectively.

The operation of the coupling shown in Figs. 6 and 7 is substantially the same as that of the coupling shown in Figs. 1 through 4. The rotary motion imparted by the driving member 10b is transferred through the radially extending arm 27b, link 29b, radially extending member 23b, torsion bar 13b and then to the rigid connection to the driven member 11b.

Figure 8:
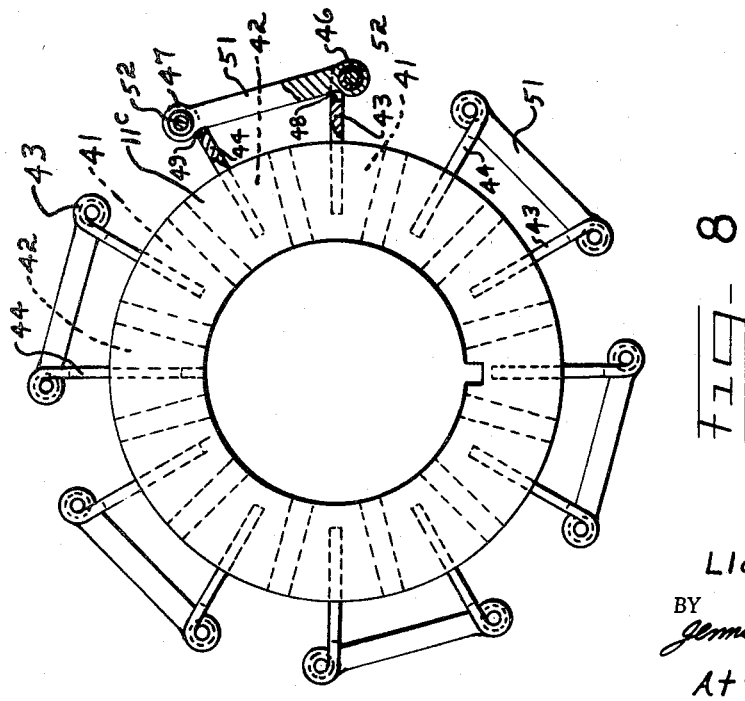
Fig. 8 is an end view, partly broken away and in section, showing a still further modified form of my invention; and, Fig. 9 is a side elevational view, partly broken away, of the coupling shown in Fig. 8.

Referring now to Figs. 8 and 9 of the drawings, I show a still further modified form of coupling for connecting a driving member 10c to a driven member 11c. The driving member 10c is provided with a plurality of angularly spaced projections 41, as shown in Fig. 9. In like manner, the driven member 11c is provided with a series of angularly spaced projections 42 which are disposed between the projections 41, as shown. The projections 41 and 42 are spaced from each other a substantial distance whereby the members 10c and 11c are adapted to move angularly relative to each other.

Secured to each of the projections 41 is a radially extending leaf spring member 43. In like manner secured to the projections 42 of the driven member 11c are radially extending leaf spring members 44. The inner ends of the radially extending members 43 and 44 are secured rigidly to the projections 41 and 42, respectively. The outer ends of the radially extending members 43 and 44 are bent over on themselves to form loop members 46 and 47, respectively. The central portion of the loops 46 and 47 are cut away as at 48 and 49 for receiving the ends of a connecting link member 51. The ends of the links 51 are connected to the loops 46 and 47 by suitable pivot connections 52.

In operation, the rotary motion imparted to the driving shaft 10c is transferred through the leaf spring member 43 to the link 51 and thence to the driven member 11c through the leaf spring member 44.

From the foregoing, it will be seen that I have devised an improved resilient coupling for transmitting power from one rotary member to another rotary member. By providing the relatively long radially extending arms which are operatively connected to or form the spring members together with the link connection between the radially extending arms my improved coupling is adapted for use with driving and driven elements which are misaligned a substantial amount. That is to say, the misalignment of one rotary member relative to the other causes the long radially extending arms to move relative to each other, thus causing the links connecting the radially extending arms to pivot relative to the arms. Due to the fact that the radially extending arms and the links connecting the arms are so much longer than the distance that the pivotal ball joints move relative to the arms, a substantial misalignment of the driven element relative to the driving element would only move the pivoted surfaces at the outer ends of the radially extending arms a small amount. Also, by providing polished steel and bronze as the rubbing surfaces between the moving elements of the ball joints, together with the greatly levered down rubbing action imparted to the ball joints, there is a minimum of wear of the moving parts of the coupling. That is to say, the long lever together with the relatively small ball joint reduces the velocity of movement of the adjacent parts or surfaces whereby there is less velocity to contend with and at the same time more surface is provided. Furthermore, by providing spring members which are connected to radially extending arms, together with links connecting the outer ends of the radially extending arms, a maximum resilient overtravel of the moving parts is provided, thus resulting in a greater safety factor.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a coupling for transmitting power from one rotary member to another rotary member, a radially extending member operatively connected adjacent its inner end to one of said rotary members, a second radially extending member operatively connected adjacent its inner end to the other of said rotary members, link means operatively connecting the outer ends of said radially extending members to each other, and resilient means interposed between at least one of said radially extending members and its associated rotary member.

2. A coupling as defined in claim 1 in which the resilient means is in the form of a torsion bar.

3. A coupling as defined in claim 1 in which a torsion spring member is interposed between both radially extending members and their associated rotary members.

4. In a coupling for transmitting power from one rotary member to another rotary member, a plurality of pairs of radially extending members with one radially extending member of each pair operatively connected adjacent its inner end to one of said rotary members and the other radially extending member of each pair operatively connected adjacent its inner end to the other of said rotary members, links operatively connecting the outer ends of each pair of radially extending members to each other, and a spring member interposed between at least one radially extending member of each pair of members and its associated rotary member.

5. In a coupling for transmitting power from a first shaft member to a second shaft member, an elongated torsion bar extending longitudinally of said first shaft member, a radially extending arm secured at its inner end to one end of said torsion bar, means anchoring the other end of said torsion bar to said first shaft member, a second radially extending arm, means operatively connecting the inner end of said second arm to said second shaft member, and a link operatively connecting the outer ends of said radially extending arms to each other.

6. A coupling as defined in claim 5 in which said second radially extending arm is connected directly to said second shaft.

7. A coupling as defined in claim 5 in which the inner end of the second radially-extending arm is connected to one end of a second elongated torsion bar which extends longitudinally of said second shaft, and the other end of said second torsion bar is anchored to said second shaft.

8. In a coupling for transmitting power from a first shaft member to a second shaft member, there being a plurality of angularly spaced axially extending openings in at least one of the shaft members, elongated torsion bars in said openings, radially extending arms between said shafts and secured at their inner ends to the adjacent ends of said torsion bars, means anchoring the other ends of said torsion bars to their associated shaft member, other radially extending arms between said shafts, means operatively connecting the inner ends of said other radially extending arms to the other shaft member and links operatively connecting the outer ends of said first mentioned radially extending arms to the outer ends of adjacent ones of said other radially extending arms.

9. A coupling as defined in claim 8 in which the torsion bars are anchored to their associated shaft member by a spline connection.

10. In a coupling for transmitting power from one rotary member to another rotary member, a radially extending member operatively connected adjacent its inner end to one of the rotary members, a second radially extending member operatively connected adjacent its inner end to the other rotary member, a resilient member interposed between at least one of said radially extending members and its associated rotary member, a link extending between the outer ends of said radially extending members, and ball joint connections between said radially extending members and the ends of said link.

11. In a coupling for transmitting power from one rotary member to another rotary member, a radially extending member operatively connected adjacent its inner end to one of the rotary members, a second radially extending member operatively connected adjacent its inner end to the other rotary member, a resilient member interposed between at least one of said radially extending members and its associated rotary member, loops adjacent the outer ends of said radially extending members, a link extending between the outer ends of said radially extending members, and loops at opposite ends of said link and connected to the loops on the radially extending members.

References Cited in the file of this patent

UNITED STATES PATENTS

| | | |
|---|---|---|
| 545,353 | Fenner | Aug. 27, 1895 |
| 700,246 | Schultz | May 20, 1902 |
| 1,332,755 | Riedler | Mar. 2, 1920 |
| 1,342,300 | Scheler | June 1, 1920 |
| 1,438,273 | Spicer | Dec. 12, 1922 |
| 2,387,705 | Oliver | Oct. 23, 1945 |
| 2,620,639 | Burawoy | Dec. 9, 1952 |

FOREIGN PATENTS

| | | |
|---|---|---|
| 482,476 | France | Dec. 30, 1916 |